(12) United States Patent
Suhara (10) Patent No.: US 10,408,235 B2
(45) Date of Patent: Sep. 10, 2019

(54) ACCUMULATOR AND FLUID MATERIAL DISCHARGE SYSTEM

(71) Applicant: HEISHIN Ltd., Kobe (JP)

(72) Inventor: Nobuhisa Suhara, Kobe (JP)

(73) Assignee: HEISHIN Ltd., Kobe (JP)

( * ) Notice: Subject to any disclaimer, the term of this patent is extended or adjusted under 35 U.S.C. 154(b) by 152 days.

(21) Appl. No.: 15/668,303

(22) Filed: Aug. 3, 2017

(65) Prior Publication Data

US 2018/0051719 A1    Feb. 22, 2018

(30) Foreign Application Priority Data

Aug. 17, 2016  (JP) ................................. 2016-160168
May 1, 2017  (JP) ................................. 2017-091406

(51) Int. Cl.

| F16L 55/04 | (2006.01) |
|---|---|
| F15B 1/22 | (2006.01) |
| F16L 55/05 | (2006.01) |
| B05C 11/10 | (2006.01) |
| B05C 5/02 | (2006.01) |
| F15B 1/24 | (2006.01) |
| F15B 1/26 | (2006.01) |

(52) U.S. Cl.
CPC .................. *F15B 1/22* (2013.01); *B05C 5/02* (2013.01); *B05C 11/1047* (2013.01); *F16L 55/05* (2013.01); *F15B 1/24* (2013.01); *F15B 1/265* (2013.01); *F15B 2201/411* (2013.01); *F15B 2201/413* (2013.01)

(58) Field of Classification Search
CPC ......... F16L 55/04; F16L 55/05; F16L 55/053; F16L 55/045; F15B 2201/411; F15B 2201/413; Y10T 137/86381

USPC ...................................................... 138/26–31
See application file for complete search history.

(56) References Cited

U.S. PATENT DOCUMENTS

| 1,501,331 | A | * | 7/1924 | Gulick | ...................... E03D 3/06 |
|---|---|---|---|---|---|
| | | | | | 137/245 |
| 1,744,095 | A | * | 1/1930 | Auten | ..................... B23Q 3/062 |
| | | | | | 269/258 |
| 1,846,483 | A | * | 2/1932 | Gilbert | .................. F16L 55/055 |
| | | | | | 137/115.02 |
| 2,290,337 | A | * | 7/1942 | Knauth | ................... F16L 55/04 |
| | | | | | 138/30 |
| 2,530,190 | A | * | 11/1950 | Carver | .................. F16L 55/052 |
| | | | | | 138/26 |

(Continued)

FOREIGN PATENT DOCUMENTS

| JP | S63-41688 A | 2/1988 |
|---|---|---|
| JP | 2004-249243 A | 9/2004 |

*Primary Examiner* — Patrick F Brinson
(74) *Attorney, Agent, or Firm* — Renner, Otto, Boisselle & Sklar, LLP (57) ABSTRACT

Provided is an accumulator which can surely discharge a collected fluid material in a first-in first-out manner without causing stagnation of the fluid material. The accumulator includes a housing having a temporarily accumulating space configured to change an inner volume thereof in an axial direction. The housing includes a supply port and a discharge port formed at positions spaced apart from each other in the axial direction and communicating with the temporarily accumulating space. The housing also includes a flow passage for uniformly supplying a fluid material into the temporarily accumulating space through the supply port.

16 Claims, 8 Drawing Sheets

(56) References Cited

U.S. PATENT DOCUMENTS

| | | | | | |
|---|---|---|---|---|---|
| 2,828,760 | A | * | 4/1958 | Taylor | F15B 1/027 137/115.26 |
| 3,603,344 | A | * | 9/1971 | Stampfli | F16K 47/10 137/513.3 |
| 3,628,573 | A | * | 12/1971 | Loliger | F16L 55/052 137/593 |
| 3,985,063 | A | * | 10/1976 | Lemon | F16D 25/14 91/31 |
| 4,177,023 | A | * | 12/1979 | Kamiya | F04B 39/0055 138/31 |
| 4,685,491 | A | * | 8/1987 | Fulmer | F15B 1/24 138/30 |
| 4,765,366 | A | * | 8/1988 | Premiski | F15B 21/045 137/468 |
| 4,838,316 | A | * | 6/1989 | Sugimura | F15B 1/10 138/30 |
| 4,881,725 | A | * | 11/1989 | Shioda | F16F 1/12 267/179 |
| 8,499,796 | B1 | * | 8/2013 | Kulikov | F16L 55/041 137/207 |
| 2004/0164091 | A1 | | 8/2004 | Ono et al. | |

* cited by examiner

ACCUMULATOR AND FLUID MATERIAL DISCHARGE SYSTEM

CROSS-REFERENCE TO RELATED APPLICATION

This application claims priority of Japanese Patent Application Nos. 2016-160168 and 2017-091406, the content of which are incorporated herein by reference.

BACKGROUND OF THE INVENTION

The present invention relates to an accumulator which is mounted on a pipe and accumulates a liquid, and a fluid material discharge system.

Mainly in an automobile industry, a high pressure pump has been used for supplying a super high viscous liquid such as a sealing material to a dispenser. From a characteristic of such a high pressure pump, it is unavoidable that pulsation occurs in the discharged super high viscous liquid. In view of the above, there has been proposed a technique where an accumulator is disposed in front of a dispenser, and the flow having a high pressure and pulsation is converted into a fixed flow having a low pressure by temporarily accumulating the ultra high viscous liquid in the accumulator. In the case where an accumulator is used, there has been also known a technique where a liquid supplied from a high-pressure pump is directly discharged from the accumulator without using a dispenser.

Conventionally, there has been known an accumulator which is configured such that a pipe is connected to a communicating portion of a casing, and a piston which is biased by a spring is disposed in the inside of the casing (for example, see JP-A-2004-249243). In the accumulator having such a configuration, when a liquid pressure in the pipe is elevated, a liquid is collected in the casing against a biasing force of the spring, while when a liquid pressure in the pipe is lowered, the piston is moved due to a biasing force of the spring so that a liquid collected in the casing is discharged.

Further, as another accumulator, there has been known a so-called "first-in first-out type" accumulator. In such an accumulator, an inflow port and an outflow port are formed in a cylinder body. A liquid which flows into the inside of the cylinder body through the inflow port is pressed by a piston so that the liquid is made to flow out from the outflow port (for example, see JP-A-63-41688).

SUMMARY OF THE INVENTION

However, in the former accumulator, a liquid collected in the casing is discharged in the order opposite to the order of collection. The former accumulator is "first in last out type" accumulator. Accordingly, there is a possibility that a liquid collected first stagnates in the casing over a long period and hence, depending on a kind of the liquid, there may be cases where various problems arise. For example, when a liquid is a moisture curing adhesive agent, the agent is solidified in the casing so that a malfunction of a spring or the like occurs thus giving rise to a possibility that the accumulator becomes unusable. Further, in a case where the liquid is used for a food, when the liquid stagnates in the casing for a long period, there is a possibility that a hygienic problem arises due to deterioration or degradation of the liquid.

Further, in the latter accumulator, an inflow port is formed on an upper portion of an outer peripheral wall of a cylinder body. A liquid collected through this inflow port is liable to flow in an axial direction of the cylinder body, that is, toward an outflow port in an obliquely frontward direction rather than in a radial direction of the cylinder body. Accordingly, a liquid is liable to stagnate in the vicinity of a portion which opposedly faces the inflow port, that is, an area in the vicinity of an inner peripheral surface of the cylinder body on a lower portion side. Accordingly, there is also a possibility of the occurrence of a similar problem as in the case of the former accumulator.

Accordingly, it is an object of the present invention to provide an accumulator and a fluid material discharge system which can surely discharge a collected liquid (fluid material) in a first-in first-out manner without causing stagnation of the fluid.

The present invention, as a means for overcoming the above-mentioned drawbacks, provides an accumulator which includes a housing having a temporarily accumulating space which is configured to change an inner volume thereof in an axial direction. The housing includes:

a supply port and a discharge port formed at positions spaced apart from each other in the axial direction and communicating with the temporarily accumulating space; and a flow passage which uniformly supplies a fluid material into the temporarily accumulating space through the supply port.

With such a configuration, a fluid which flows into the accumulator through the supply port is uniformly supplied to the temporarily accumulating space by the flow passage. Accordingly, there is no possibility that the fluid material stagnates in a portion of the temporarily accumulating space. Further, the temporarily accumulating space is configured to change the inner volume thereof in the axial direction and the supply port and the discharge port are disposed spaced apart from each other in the axial direction and hence, in the order that the fluid material is made to flow into the temporarily accumulating space from the supply port, the fluid material is discharged from the discharge port in a first-in first-out manner.

It is preferable that the flow passage include a plurality of inner flow passages formed in the housing.

With such a configuration, the accumulator can be formed into a compact shape by reducing a portion projecting from the housing.

It is preferable that the accumulator further include a partition member which is disposed in the inside of the housing, and which has a wall portion extending uniformly along an inner surface of the housing from a position which opposedly faces the supply port, and hole portions formed such that a fluid material branched by the wall portion is introduced toward the temporarily accumulating space respectively, and the inner flow passage be defined by the inner surface of the housing and an outer surface of the wall portion of the partition member.

With such a configuration, it is possible to form the inner flow passage having the simple configuration where only the partition member is disposed in the inside of the housing.

It is preferable that the accumulator further include: a cylinder disposed movable in the axial direction in a reciprocating manner; and an annular space which connects the inner flow passage and the temporarily accumulating space be formed between an outer peripheral surface of the cylinder and an inner peripheral surface of the wall portion of the partition member.

With such a configuration, it is possible to make a fluid material which passes through the hole portions from the inner flow passage flow into the temporarily accumulating space uniformly by allowing the fluid material to pass through the annular space.

It is preferable that the accumulator further include:

a partition member which is disposed in the inside of the housing and has a partition wall uniformly extending along an inner surface of the housing from a position which opposedly faces the supply port; and a cylinder which is disposed movable in the axial direction in a reciprocating manner, wherein the inner flow passage be defined by an inner surface of the housing and an outer surface of the partition wall of the partition member, and an expansion space which connects the inner flow passage and the temporarily accumulating space be formed between the inner surface of the housing and the outer peripheral surface of the cylinder.

With such a configuration, by allowing a fluid material which passes through the inner flow passage to flow into the expansion space, the fluid material is further dispersed and, thereafter, is made to flow into the temporarily accumulating shape.

It is preferable that the housing include the plurality of supply ports, and the flow passage include a plurality of external flow passages which are respectively connected to the plurality of supply ports.

With such a configuration, it is possible to simplify the internal structure of the housing.

It is preferable that the housing have a cylindrical shape, an inner surface of the housing on one end side be formed of a distal end surface of the cylinder movable toward the inner surface of the housing on the other end side, and a projecting portion be formed on a center portion of the distal end surface of the cylinder.

With such a configuration, that is, due to the provision of the projecting portion, it is possible to make the flow of a fluid material in the temporarily accumulating space more difficult to stagnate.

The accumulator may include:

a cylinder disposed movable in the axial direction in a reciprocating manner; and a biasing means for biasing the cylinder such that the cylinder projects toward the inside of the temporarily accumulating space.

The accumulator may include:

a cylinder disposed movable in the axial direction in a reciprocating manner; and a pressure applying means configured to apply a fluid pressure to the cylinder such that the cylinder projects toward the inside of the temporarily accumulating space.

The accumulator may include:

a cylinder disposed movable in the axial direction in a reciprocating manner; and a drive means which is configured to make the cylinder project toward the inside of the temporarily accumulating space.

The present invention also provides, as a means for overcoming the above-mentioned drawbacks, a fluid material discharge system which includes:

a pump;

a dispenser which discharges a fluid material supplied from the pump; and the accumulator having any one of the above-mentioned configurations, the accumulator being mounted on a middle portion of a pipe which connects the dispenser and the pump to each other.

The present invention also provides, as a means for overcoming the above-mentioned drawbacks, a fluid material discharge system which includes:

a pump; and the accumulator having any one of above-mentioned configurations, the accumulator being configured to discharge a fluid material supplied from the pump.

The present invention provides, as a means for overcoming the above-mentioned drawbacks, a fluid material discharge system which includes:

a pump;

the accumulator having any one of the above-mentioned configurations, to which a fluid material is supplied from the pump; and an open/close valve connected to a downstream side of the accumulator.

According to the present invention, the supply port and the discharge port which are spaced apart from each other in the axial direction are formed in the housing, and the inner volume of the temporarily accumulating space of the housing is changeable in the axial direction and hence, the fluid material can be discharged from the discharge port in the order that the fluid material is supplied to the temporarily accumulating space from the supply port. Further, a fluid material is uniformly supplied to the temporarily accumulating space through the flow passage and hence, there is no possibility that a fluid partially stagnates in the inside of the temporarily accumulating space and hence, it is possible to prevent the occurrence of drawbacks such as solidification of a fluid material or degradation of the fluid material.

DETAILED DESCRIPTION OF THE PREFERRED EMBODIMENT

Hereinafter, an embodiment of the present invention is described with reference to attached drawings. In the description made hereinafter, terms indicative of specific directions and positions (for example, terms including "up", "down", "side", and "end") are used when necessary. However, these terms are used for merely facilitating understanding of the invention with reference to drawings, and the technical scope of the present invention is not limited by meaning of these terms. Further, the description made hereinafter merely shows an example essentially, and does not intend to limit the present invention, products to which the present invention is applied, or its applications. Further, drawings are schematically shown and hence, ratios of respective sizes and the like differ from actual ratios of sizes and the like.

Figure 1:
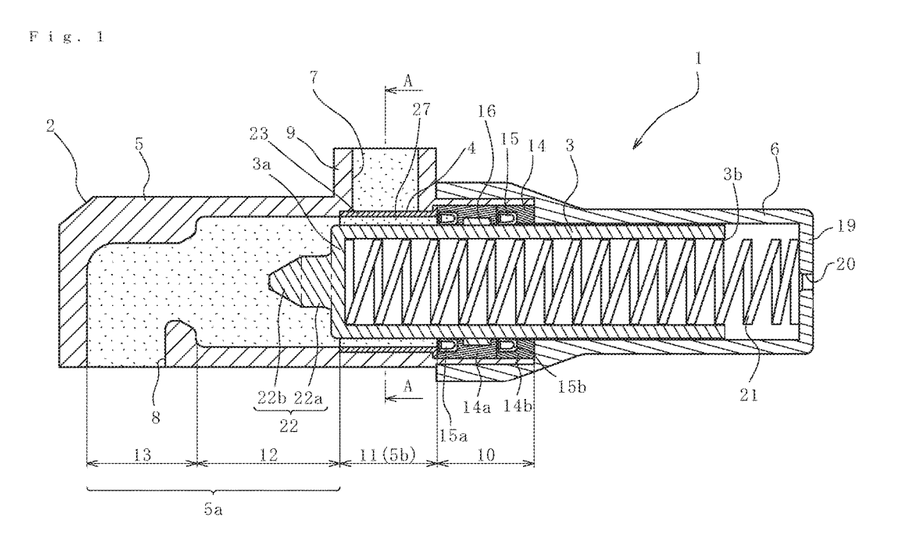
FIG. 1 is a longitudinal cross-sectional view of an accumulator according to an embodiment of the present invention.

FIG. 1 shows an accumulator 1 according to this embodiment. The accumulator 1 is configured such that a cylinder 3 and a partition member 4 are stored in the inside of the housing 2.

The housing 2 has a cylindrical shape, and is constituted of a first housing 5 and a second housing 6. A supply port 7 and a discharge port 8 are formed on both end sides of the first housing 5 respectively. The supply port 7 makes the inside and the outside of the first housing 5 communicate with each other. The discharge port 8 also makes the inside and the outside of the first housing 5 communicate with each other. In FIG. 1, the supply port 7 is formed of a cylindrical portion 9 which projects upward from one end side of the first housing 5. The discharge port 8 is opened in a lower surface of the first housing 5 on the other end side. One end portion of the first housing 5, that is a portion disposed closer to the end than the supply port 7 has an outer diameter slightly smaller than that of the other portions, and the second housing 6 is connected to the smaller diameter portion.

The inside of the first housing 5 is partitioned into a first region 10, a second region 11, a third region 12, and a fourth region 13 in this order from one end side of the first housing 5. An internal space in which a fluid material flows is formed by the second region 11, the third region 12 and the fourth region 13.

The first region 10 has a larger inner diameter than the second region 11 and the third region 12, and a seal member 15 stored in a seal case 14 is disposed in the first region 10. The seal case 14 is formed of a first seal case 14a and a second seal case 14b which are arranged in a row in an axial direction of the housing 2. The first seal case 14a is longer than the second seal case 14b. A first seal member 15a and a wear ring 16 are disposed on an inner peripheral surface of the first seal case 14a. A second seal member 15b having substantially the same configuration as the first seal member 15a is disposed on an inner peripheral surface of the second seal case 14b. These seal members 15 are brought into close contact with an outer peripheral surface of the cylinder 3 thus providing sealing between the first housing 5 and the second housing 6. The wear ring 16 functions as a thrust bearing which supports the cylinder 3 described later in a slidable manner in the axial direction.

Figure 2:
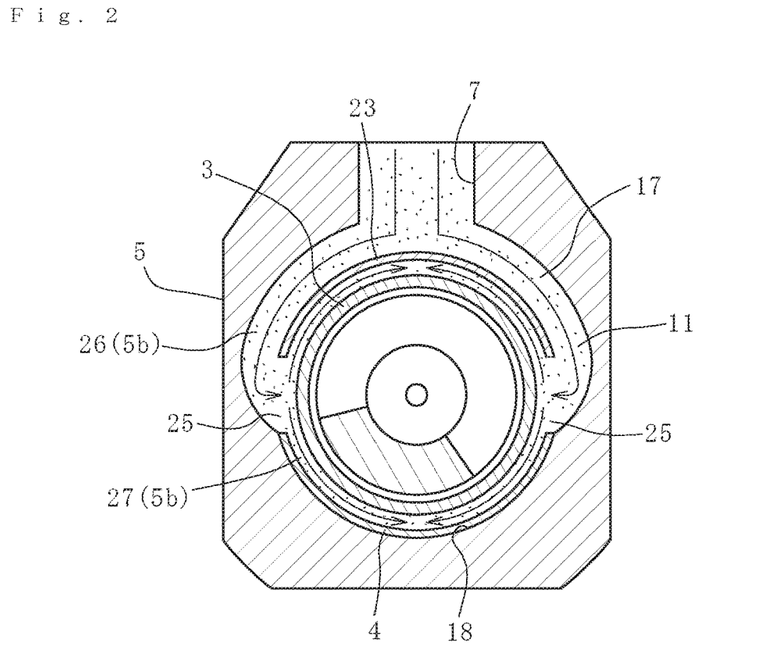
FIG. 2 is a cross-sectional view taken along a line A-A in FIG. 1.

The supply port 7 is opened in the second region 11. In FIG. 1, the supply port 7 is opened at an upper side in the second region 11 (the position where the supply port 7 is opened is not particularly limited). As shown in FIG. 2, a first enlarged diameter portion 17 having a large inner diameter is formed toward both sides in the circumferential direction from the opening portion. A second enlarged diameter portion 18 having an inner diameter smaller than that of the first enlarged diameter portion 17 is formed at a portion below the first enlarged diameter portion 17. The partition member 4 described later is disposed in the second region 11.

Returning to FIG. 1, the third region 12 forms, in cooperation with the fourth region 13 described later, a temporarily accumulating space 5a in an inner space of the first housing 5. In the third region 12, a portion of the cylinder 3 described later is disposed in a projectable manner. The cylinder 3 is pressed by a spring 21 which is one example of a biasing means so that a fixed pressurizing force constantly acts on a fluid material in the third region 12 and the fourth region 13.

The fourth region 13 is a space for making the third region 12 communicate with the discharge port 8. The fourth region 13 extends downward with respect to the axial direction of the first housing 5 in FIG. 1. A portion of a flow passage where the fourth region 13 is connected to the third region 12 has a narrow cross-sectional area. With such a configuration, it is possible to make a pressurizing force by the cylinder 3 effectively act on a fluid material.

The second housing 6 has one end side thereof enlarged in an outer diameter direction and connected to one end portion of the first housing 5 (an outer peripheral surface of a portion corresponding to the first region 10). The other end side of the second housing 6 is closed, and one end portion of the spring 21 can be brought into pressure contact with an inner surface of a closed wall 19 of the second housing 6. Further, an air bleeding hole 20 is formed in a center portion of the closed wall 19. The air bleeding hole 20 prevents the increase and the decrease of an internal air pressure when the cylinder 3 moves in a reciprocating manner thus attenuating an air resistance generated when the cylinder 3 moves in a reciprocating manner.

The cylinder 3 has a hollow cylindrical shape with one end side thereof closed and the other end side thereof opened, and a spring 21 which forms a biasing means disposed in an internal space of the cylinder 3. One end portion of the spring 21 is brought into contact with an inner surface of a closed wall 3a of the cylinder 3, and the other end portion of the spring 21 projects from an opening 3b of the cylinder 3 and is brought into contact with an inner surface of the closed wall 19 of the second housing 6. With such a configuration, in FIG. 1, the cylinder 3 is biased in a leftward direction, that is, toward a distal end surface side, and is brought into a state where the cylinder 3 can be projected to or retracted from the third region 12. With such a configuration, an inner volume of the temporarily accumulating space 5a of the first housing 5 can be changed. A projecting portion 22 is formed on a center portion of an outer surface of the closed wall 3a of the cylinder 3. The projecting portion 22 is formed of a circular columnar portion 22a and a frustoconical portion 22b disposed on a distal end side of the circular columnar portion 22a. The projecting portion 22 projects toward a center portion of the third region 12.

Figure 3:
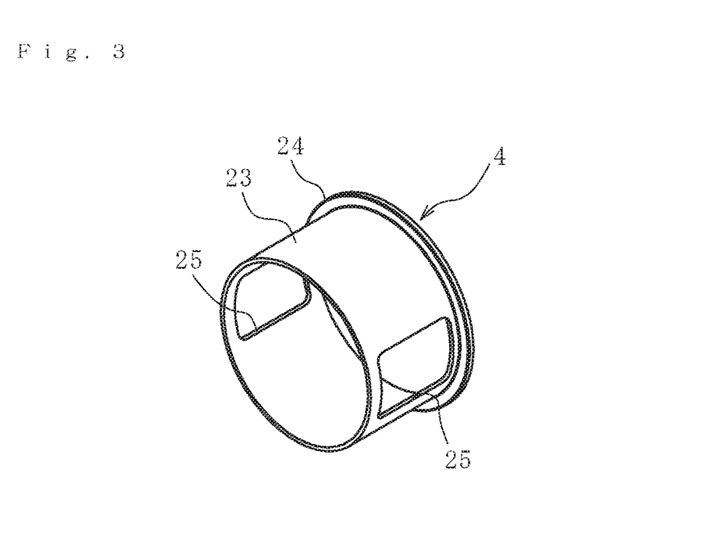
FIG. 3 is a perspective view of a partition member shown in FIG. 1.

As shown in FIG. 3, the partition member 4 includes a cylindrical wall portion 23. A flange portion 24 is formed on a one-end-side opening portion of the wall portion 23. A hole portion 25 is formed in the wall portion 23 at two positions disposed symmetrically with respect to an axis of the partition member 4. Each hole portion 25 is formed into a rectangular shape as viewed in a plan view.

As shown in FIG. 1, the partition member 4 is mounted in the second region 11 of the first housing 5. In a state where the partition member 4 is mounted in the second region 11, as shown in FIG. 2, a portion of the wall portion 23 disposed below the hole portions 25 is brought into contact with the second enlarged diameter portion 18 disposed on a lower side of the second region 11. Further, an inner peripheral surface of the wall portion 23 and an inner peripheral surface of the third region 12 are disposed coplanar with each other. The portion of the wall portion 23 disposed above the hole portions 25 is disposed such that a gap is formed between the portion and an inner surface of the first enlarged diameter portion 17 of the second region 11. In such a configuration, the respective hole portions 25 are positioned in a horizontal direction (a direction orthogonal to a surface of a paper on which FIG. 1 is drawn). It is preferable that the partition member 4 be positioned with respect to the first housing 5 in a rotational direction using a pin or the like so that the hole portions 25 be always disposed at such positions. Further, lower edge portions of the respective hole portions 25 are positioned at terminal end positions of the first diameter enlarged portion 17 in the second region 11 of the first housing 5. With such a configuration, two inner flow passages 26 which respectively reach the hole portions 25 on both sides from the upper supply port 7 through the gap are formed. Further, an annular space 27 is formed between the inner peripheral surface of the wall portion 23 of the partition member 4 and the outer peripheral surface of the cylinder 3. Both the inner flow passages 26 and the annular space 27 are portions of the internal space and, as described later, the inner flow passages 26 and the annular space 27 function as a flow passage 5b for uniformly supplying a fluid material to the temporarily accumulating space 5a of the first housing 5.

The accumulator 1 having the above-mentioned configuration can be adopted by a fluid material discharge system described hereinafter.

Figure 4:
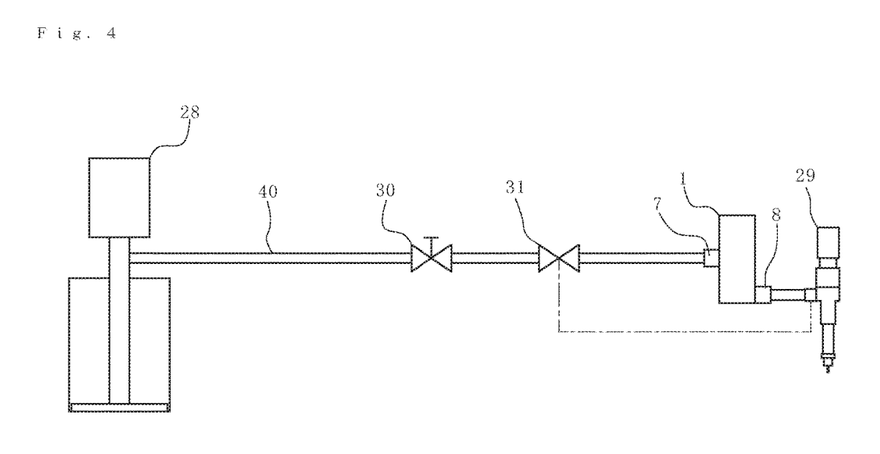
FIG. 4 is a schematic view showing one example of a fluid discharging system to which the accumulator of the present invention is applied.

For example, as shown in FIG. 4, the accumulator 1 can be connected to a middle portion of a pipe 40 which connects a high-pressure pump 28 and a dispenser 29 to each other. In the pipe 40, a pressure reducing valve 30 and an open/close valve 31 are connected to an upstream side of the accumulator 1 from a high-pressure pump 28 side. The open/close valve 31 is opened or closed in response to a discharge state of the dispenser 29.

When a fluid material is supplied to the dispenser 29 from the high-pressure pump 28, there is a possibility that drawback such as pulsation or the like occurs. However, by adopting the accumulator 1 as described above, the occurrence of such a drawback can be prevented. In the accumulator 1, as shown in FIG. 2, a fluid material which flows into the inside of the accumulator 1 (second region 11) from the supply port 7 impinges on the wall portion 23 of the partition member 4 and is branched, and branched fluid materials respectively flow into the inner flow passages 26 and reach the hole portions 25. The hole portions 25 are formed equally on the left and right sides and hence, the branched fluid materials enter the annular space 27 simultaneously. The branched fluid materials flow in such a manner that each branched fluid material is further branched into two in the circumferential direction in the annular space and, thereafter, further branched fluid materials flow into the third region 12 from the annular space 27. In this manner, the fluid material flows in a two branched manner, and each branched fluid material is further branched into two flows and the branched fluid materials spread in the annular space 27 and, thereafter, flows to the third region 12. Accordingly, an approximately ring-shaped uniform flow is generated in a direction from the second region 11 side to the third region 12 side. Further, the projecting portion 22 is formed on the distal end of the cylinder 3 and hence, an inlet portion (second region 11 side) of the third region 12 is also formed in an annular shape. Accordingly, the flow of the fluid material from the annular space 27 agrees with the shape of the inlet portion of the third region 12 and hence, it is possible to make the fluid material easily flow uniformly as a whole so that there is no possibility that the fluid material stagnates in a portion of the accumulator 1.

Figure 10:
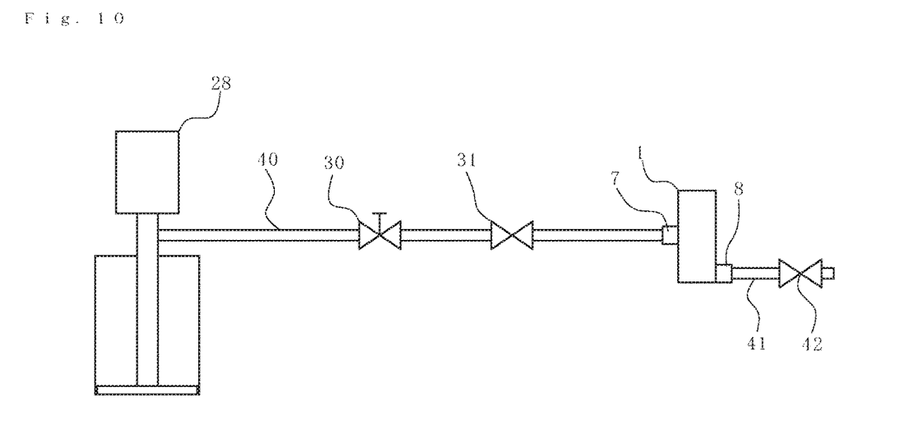
FIG. 10 is a schematic view showing one example of a fluid discharging system according to another embodiment to which the accumulator according to the present invention is applied.

As shown in FIG. 10, a fluid material may be discharged directly from the accumulator 1 without using the dispenser 29. In this case, it is preferable that a pipe 41 be connected to the discharge port 8 of the accumulator 1, and an open/close valve 42 be mounted on the middle of the pipe 41. With such a configuration, a fluid material which is supplied into the temporarily accumulating space 5a of the housing 2 receives a pressurizing force generated by the cylinder 3 which projects to the inside of the temporarily accumulating space 5a and flows out from the discharge port 8. When the open/close valve 42 is provided, a pressure of a fluid material in the temporarily accumulating space 5a may be adjusted such that the pressure of the fluid material always falls within a predetermined range by properly opening or closing the open/close valve 42. With such an operation, a discharge amount of a fluid material per unit time can be stabilized.

The present invention is not limited to the configuration described in the above-mentioned embodiment, and various modifications are conceivable.

Figure 5:
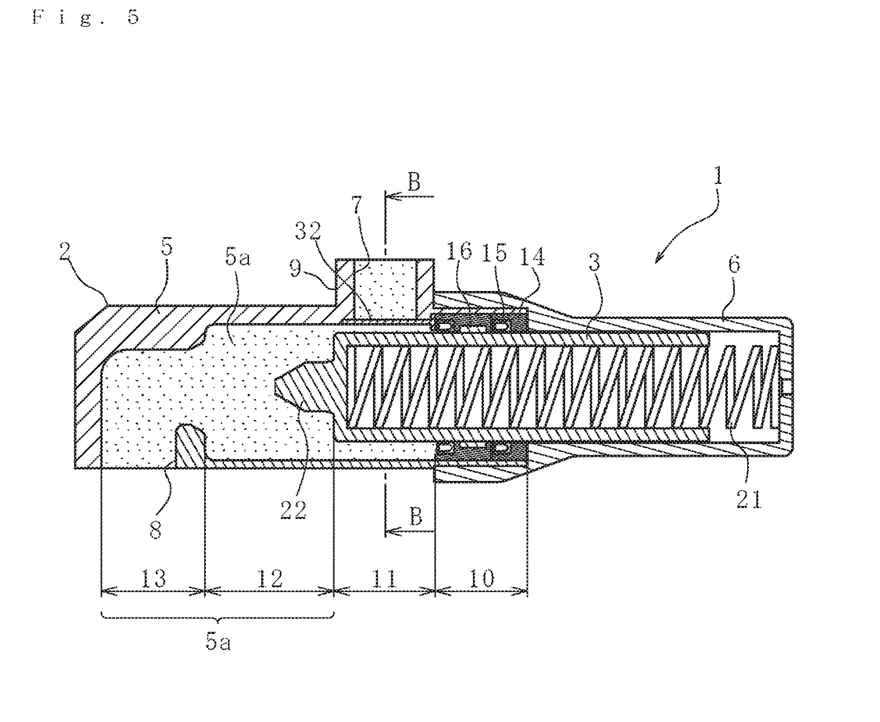
FIG. 5 is a longitudinal cross-sectional view of an accumulator according to another embodiment.
Figure 6:
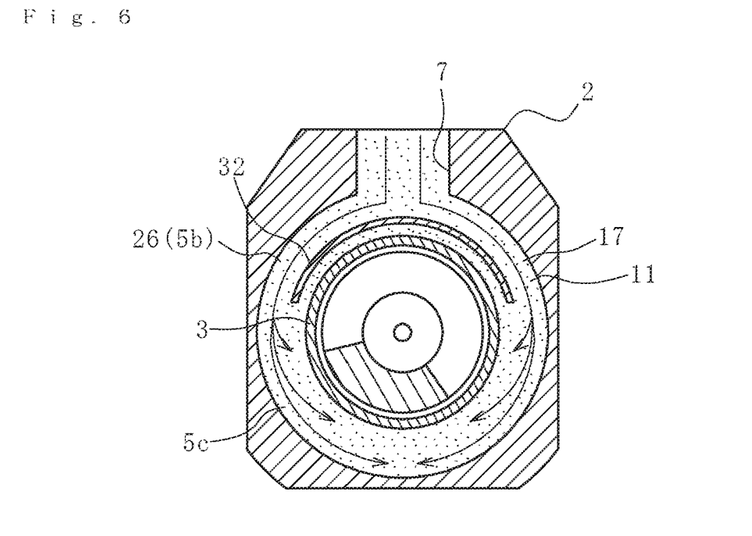
FIG. 6 is a cross-sectional view taken along a line B-B in FIG. 5.

In the above-mentioned embodiment, the partition member 4 mounted in the housing 2 has a cylindrical shape. However, for example, as shown in FIG. 5 and FIG. 6, the partition member may be formed of a partition wall 32 having an arcuate shape in cross section which is constituted of only a portion of the partition member 4 disposed above the hole portions 25. In this case, the partition wall 32 may be fixed to the inner surface of the housing 2 where the supply port 7 of the cylindrical portion 9 opens. The second region 11 is formed of only an inner peripheral surface having an inner diameter equal to an inner diameter of the first enlarged diameter portion 17 without forming the second enlarged diameter portion 18. With such a configuration, a fluid material which is branched by the partition wall 32 flows in an upper half portion of the second region 11, that is, the inner flow passage 26 and, thereafter, flows out to the third region 12 in the temporarily accumulating space 5a while being dispersed in a lower half portion of the second region 11, that is, an expansion space 5c.

Figure 7:
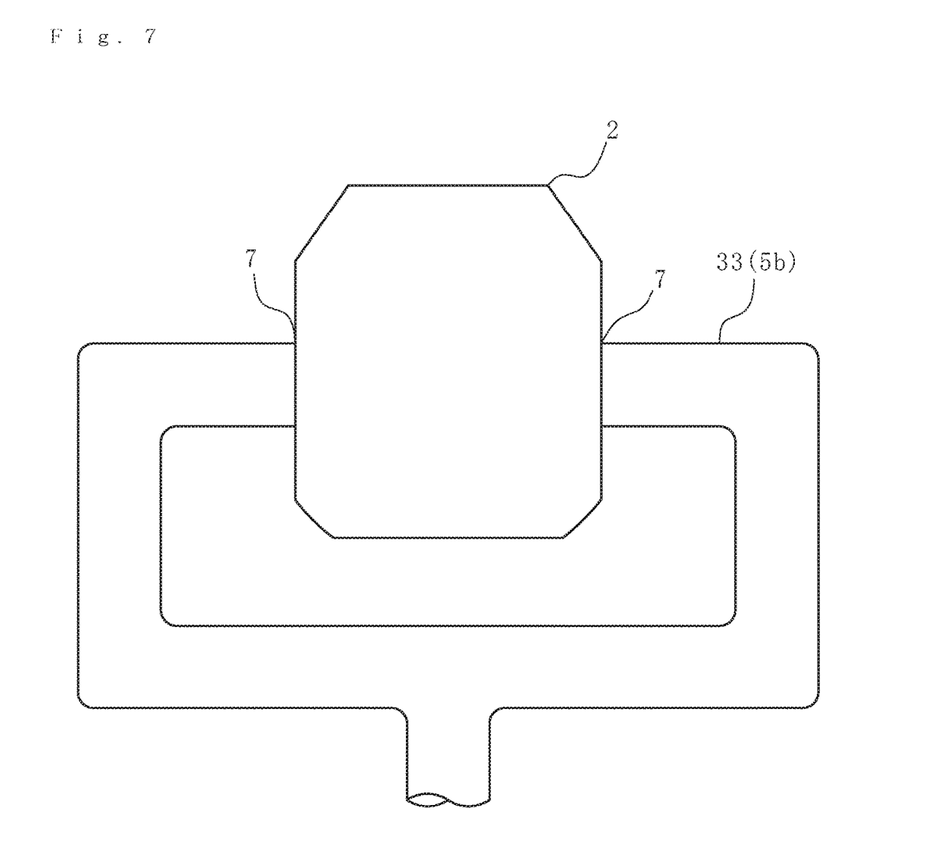
FIG. 7 is a transverse cross-sectional view of the accumulator according to another embodiment.

In the above-mentioned embodiment, by mounting the partition member 4 in the housing 2, two inner flow passages 26 are provided as the flow passage 5b. Instead of this, the flow passage 5b may include an external flow passage 33 which is connected to the outside of the housing 2. For example, as shown in FIG. 7, a supply port 7 may be formed in two portions of the housing 2, and the external flow passages 33 (for example, a supply pipe) may be connected to the respective supply ports 7 respectively. The external flow passage 33 is designed such that piping resistances in respective branched flow passages become equal so that a fluid material is uniformly supplied to the respective supply ports 7. With such a configuration, it is possible to easily form two flow passages (external flow passages 33) without specially devising the internal configuration of the housing 2. In this embodiment, the external flow passage 33 is configured such that one pipe is branched at a middle portion thereof.

The flow passage 5b may be configured such that the flow passage 5b includes both the inner flow passage 26 and the external flow passage 33. For example, a fluid material which is branched by the external flow passage 33 may be further branched by the inner flow passage 26 formed in the housing 2. With such a configuration, a fluid material which is made to flow into the third region 12 can be brought into a further uniform flow state compared to the respective embodiments thus preventing the occurrence of stagnation of the fluid material.

Figure 8:
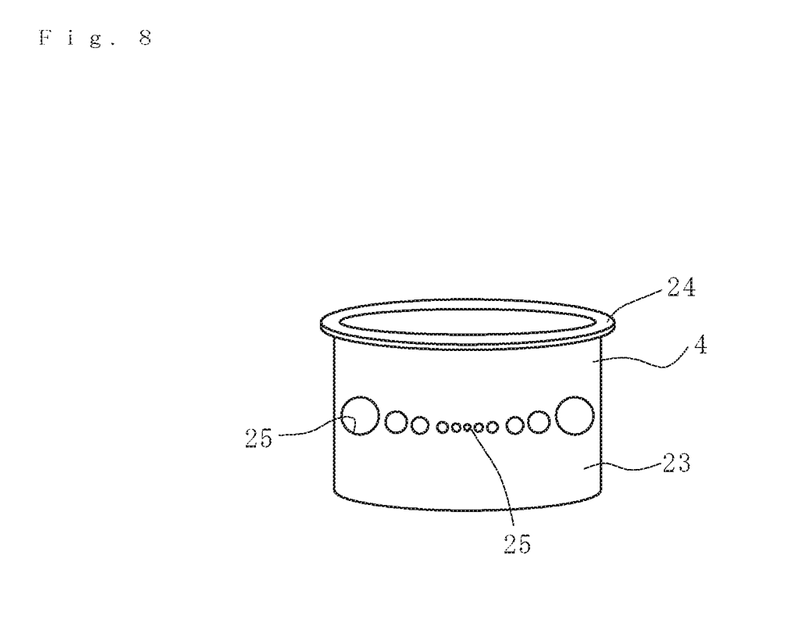
FIG. 8 is a perspective view of a partition member according to another embodiment.

In the above-mentioned embodiment, the hole portion 25 is formed in two portions of the partition member 4, and the hole portions 25 have the same shape. However, the number and the shapes of the hole portions 25 may differ from the number and the shapes of the hole portions 25 adopted in the above-mentioned embodiment. For example, as shown in FIG. 8, a plurality of hole portions 25 may be formed in the wall portion 23 of the partition member 4 along a circumferential direction of the wall portion 23, and shapes of the respective hole portions 25 may be changed such that sizes of inner diameters of the hole portions 25 are gradually increased toward both sides from a certain position (in this example, a center position). In this case, the hole portions 25 may be disposed such that the hole portion 25 having the smallest diameter opposedly faces the supply port 7. That is, the hole portions 25 may be disposed such that as the distance from the fluid material supply position is increased so that a liquid pressure is gradually decreased, the hole portion 25 having the smaller flow resistance is disposed. With such a configuration, a fluid material supplied from the supply port 7 is made to flow into the annular space 27 through the small-diameter hole portions 25 having a large flow resistance in a region where a liquid pressure is high, that is, in a region close to the supply port 7. On the other hand, as the liquid pressure is lowered, the diameters of the hole portions 25 are gradually increased and the fluid material passes through the large-diameter hole portions having the small flow resistance on both sides. Accordingly, a plurality of flow passages 5b directed toward the respective hole portions 25 from the supply port 7 are formed, and the flow of the fluid material is branched by these flow passages 5b. Further, the fluid material is made to flow into the annular space 27 from the hole portions 25 so that the directions of the fluid materials are changed and hence, the flow of the fluid material toward the temporarily accumulating space 5a becomes uniform. Accordingly, the fluid material can be made to flow uniformly in the whole annular space 27 thus preventing the stagnation of the fluid material in the third region 12 further effectively.

Figure 9:
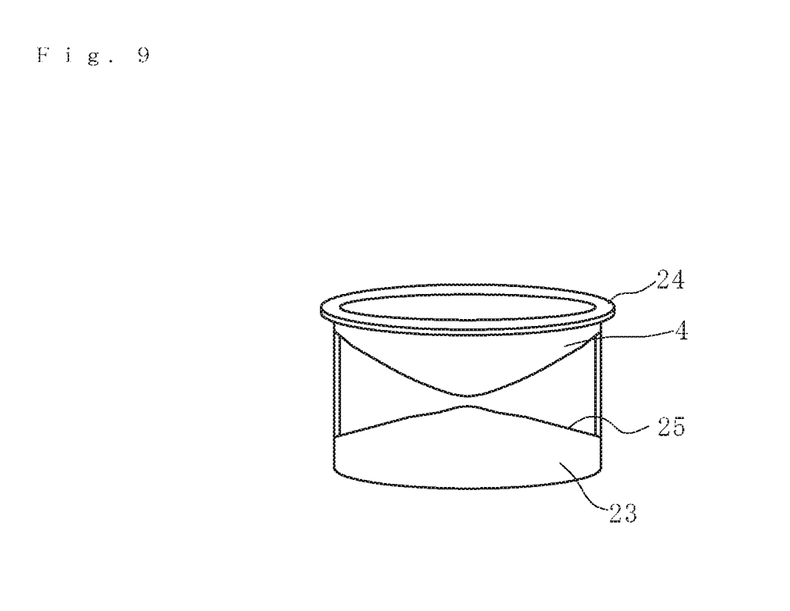
FIG. 9 is a perspective view of the partition member according to further another embodiment.

In the above-mentioned embodiment, the hole portion 25 is formed in two portions of the partition member 4. However, the hole portion 25 may be formed in one portion or a plurality of portions of the partition member 4, and the shapes of the hole portions 25 may be changed in the circumferential direction. For example, as shown in FIG. 9, a hole portion 25 having a width thereof gradually increased as the hole portion 25 extends from a certain position toward both sides of the certain position may be formed. In such a case, in the same manner as the configuration shown in FIG. 8, a flow resistance which the fluid material receives when the fluid material passes through the hole portion 25 is gradually decreased corresponding to the lowering of a liquid pressure, that is, as the hole portion 25 is disposed away from the supply port 7 and hence, the flow of the fluid material toward the annular space 27 can be made uniform in the circumferential direction. With such a configuration, the flow passage 5b for uniformly supplying the fluid material through the supply port 7 and the annular space 27 is formed. Accordingly, the flow of the fluid material toward the third region 12 from the annular space 27 can be made uniform thus preventing partial stagnation of the fluid material in the third region 12.

In the above-mentioned embodiment, to make the cylinder 3 project into the temporarily accumulating space 5a, a biasing force of the spring 21 is used. However, the cylinder 3 may be operated using other methods.

Figure 11:
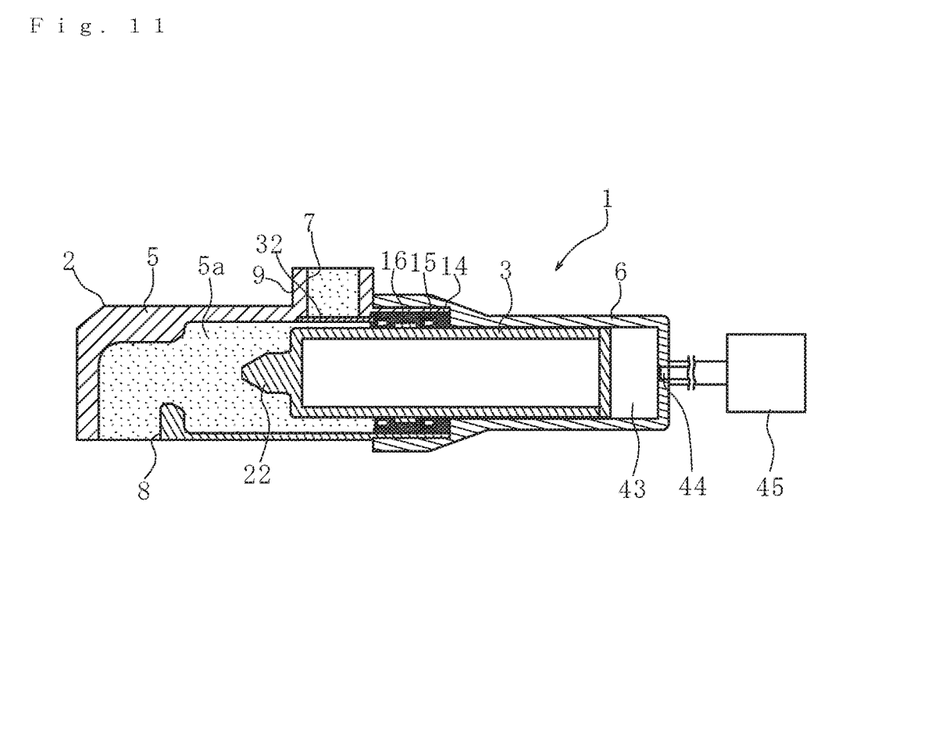
FIG. 11 is a longitudinal cross-sectional view of an accumulator according to further another embodiment.

For example, in FIG. 11, the cylinder 3 is operated by making use of a fluid pressure. That is, not only a distal end side of the cylinder 3 but also a rear end side of the cylinder 3 is closed, and a closed space 43 is formed between the cylinder 3 and the other end surface of the second housing 6. A fluid is supplied from the outside of the closed space 43 and is discharged to the outside of the closed space 43 through a through hole 44 formed in the other end surface of the second housing. As a fluid to be used, a gas such as air or a liquid such as water can be named. As a pressurizing and a pressure reducing means for supplying and discharging a fluid, a pump 45, a solenoid (not shown in the drawing) or the like can be used. By supplying a fluid to the closed space 43, it is possible to project the cylinder 3 into the temporarily accumulating space 5a. With such a configuration, a fluid material accumulated in the inside of the temporarily accumulating space 5a is pressurized so that the fluid material can be discharged from the discharge port 8. In FIG. 11, constitutional elements substantially equal to the corresponding constitutional elements of the above-mentioned embodiment are given the same symbols and their description is omitted.

Figure 12:
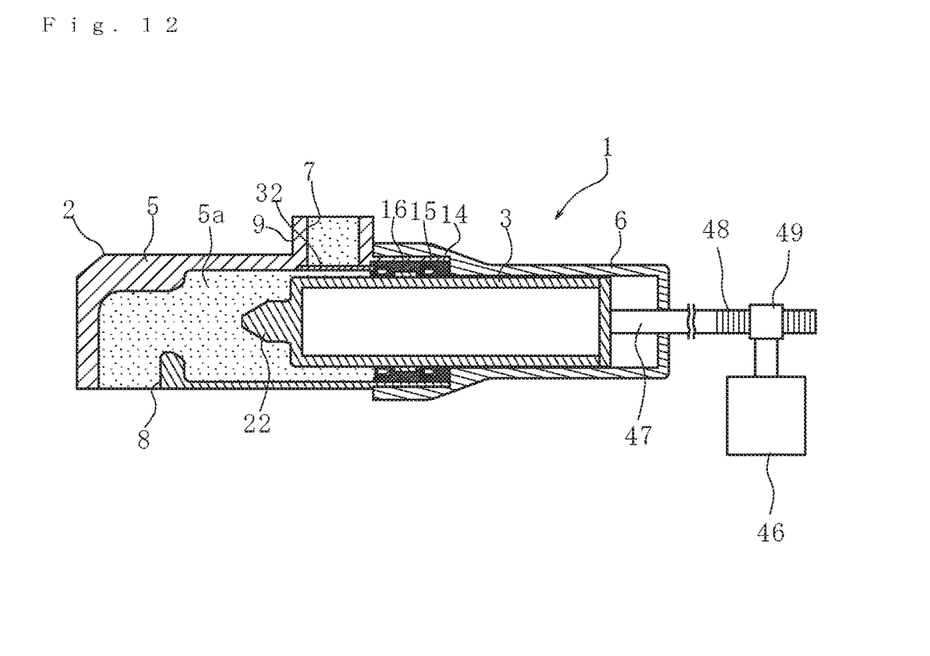
FIG. 12 is a longitudinal cross-sectional view of an accumulator according to still further another embodiment.

In FIG. 12, the cylinder 3 is operated by making use of a drive means such as a motor 46, or a solenoid (not shown in the drawing). When the motor 46 is used as the drive means, a rack 48 may be formed on a rod 47 which projects from a rear end surface of the cylinder 3, and a pinion 49 integrally formed with a rotary shaft of the motor 46 may be meshed with the rack 48. When the solenoid is used as the drive means, the rod 47 may be made extensible and retractable by the solenoid. Also in FIG. 12, constitutional elements substantially equal to the corresponding constitutional elements of the above-mentioned embodiment are given the same symbols and their description is omitted.

What is claimed is:

1. An accumulator comprising a housing having a temporarily accumulating space configured to change an inner volume thereof in an axial direction, wherein the housing includes:
   a supply port and a discharge port formed at positions spaced apart from each other in the axial direction and communicating with the temporarily accumulating space; and
   a flow passage for constantly and uniformly supplying a fluid material into the temporarily accumulating space through the supply port.

2. The accumulator according to claim 1, wherein the flow passage includes a plurality of inner flow passages formed in the housing.

3. An accumulator comprising a housing having a temporarily accumulating space configured to change an inner volume thereof in an axial direction, wherein the housing includes:
   a supply port and a discharge port formed at positions spaced apart from each other in the axial direction and communicating with the temporarily accumulating space;

a flow passage for uniformly supplying a fluid material into the temporarily accumulating space through the supply port; and a partition member disposed in the inside of the housing and having a wall portion extending uniformly along an inner surface of the housing from a position which opposedly faces the supply port; and hole portions formed in the wall portion such that a fluid material branched by the wall portion is introduced toward the temporarily accumulating space respectively through the hole portions, wherein the inner flow passage is defined by the inner surface of the housing and an outer surface of the wall portion of the partition member.

4. The accumulator according to claim 3 further comprising a cylinder which is disposed movable in the axial direction in a reciprocating manner, wherein an annular space connecting the inner flow passage and the temporarily accumulating space to each other is formed between an outer peripheral surface of the cylinder and an inner peripheral surface of the wall portion of the partition member.

5. An accumulator comprising a housing having a temporarily accumulating space configured to change an inner volume thereof in an axial direction, wherein the housing includes:

a supply port and a discharge port formed at positions spaced apart from each other in the axial direction and communicating with the temporarily accumulating space;

a flow passage for uniformly supplying a fluid material into the temporarily accumulating space through the supply port;

a partition member disposed in the inside of the housing and having a partition wall uniformly extending along an inner surface of the housing from a position which opposedly faces the supply port; and a cylinder disposed movable in the axial direction in a reciprocating manner, wherein the inner flow passage is defined by an inner surface of the housing and an outer surface of the partition wall of the partition member, and an expansion space connecting the inner flow passage and the temporarily accumulating space to each other is formed between the inner surface of the housing and the outer peripheral surface of the cylinder.

6. The accumulator according to claim 1, wherein the housing includes the plurality of supply ports, and the flow passage includes a plurality of external flow passages which are respectively connected to the plurality of supply ports.

7. The accumulator according to claim 1, further comprising a cylinder which is disposed movable in the axial direction in a reciprocating manner, wherein the housing has a cylindrical shape, an inner surface of the housing on one end side is formed of a distal end surface of the cylinder movable toward the inner surface of the housing on the other end side, and a projecting portion is formed on a center portion of the distal end surface of the cylinder.

8. The accumulator according to claim 1 comprising:

a cylinder disposed movable in the axial direction in a reciprocating manner; and a biasing means for biasing the cylinder such that the cylinder projects toward the inside of the temporarily accumulating space.

9. The accumulator according to claim 1 comprising:

a cylinder disposed movable in the axial direction in a reciprocating manner; and a pressure applying means configured to apply a fluid pressure to the cylinder such that the cylinder projects toward the inside of the temporarily accumulating space.

10. The accumulator according to claim 1 comprising:

a cylinder disposed movable in the axial direction in a reciprocating manner; and a drive means configured to make the cylinder project toward the inside of the temporarily accumulating space.

11. A fluid material discharge system comprising:

a pump;

a dispenser configured to discharge a fluid material supplied from the pump; and the accumulator according to claim 1, the accumulator being mounted on a middle portion of a pipe which connects the dispenser and the pump to each other.

12. A fluid material discharge system comprising:

a pump; and the accumulator according to claim 1, the accumulator discharging a fluid material supplied from the pump.

13. A fluid material discharge system comprising:

a pump; and the accumulator according to claim 1 to which a fluid material is supplied from the pump; and an open/close valve connected to a downstream side of the accumulator.

14. The accumulator according to claim 3, wherein the flow passage includes a plurality of inner flow passages formed in the housing.

15. The accumulator according to claim 5, wherein the flow passage includes a plurality of inner flow passages formed in the housing.

16. The accumulator according to claim 1, further comprising a partition member in the flow passage between the supply port and the temporarily accumulating space, the partition member having one or more openings extending therethrough that always remain open to allow the fluid material to constantly and uniformly be supplied from the supply port to the temporarily accumulating space via the one or more openings.

* * * * *